US010057587B2

(12) United States Patent
Zou et al.

(10) Patent No.: US 10,057,587 B2
(45) Date of Patent: Aug. 21, 2018

(54) CODING ESCAPE PIXELS FOR PALETTE MODE CODING

(71) Applicant: QUALCOMM Incorporated, San Diego, CA (US)

(72) Inventors: Feng Zou, San Diego, CA (US); Vadim Seregin, San Diego, CA (US); Marta Karczewicz, San Diego, CA (US); Wei Pu, Pittsburgh, PA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 15/009,609

(22) Filed: Jan. 28, 2016

(65) Prior Publication Data
US 2016/0227225 A1 Aug. 4, 2016

Related U.S. Application Data

(60) Provisional application No. 62/110,519, filed on Jan. 31, 2015.

(51) Int. Cl.
*H04N 19/13* (2014.01)
*H04N 19/186* (2014.01)
(Continued)

(52) U.S. Cl.
CPC ....... *H04N 19/186* (2014.11); *G06F 9/30018* (2013.01); *H04N 19/105* (2014.11);
(Continued)

(58) Field of Classification Search
CPC .............. G06F 9/30018; H04N 19/105; H04N 19/124; H04N 19/126; H04N 19/13; H04N 19/139; H04N 19/147; H04N 19/176; H04N 19/186; H04N 19/44; H04N 19/52; H04N 19/577; H04N 19/593; H04N 19/61; H04N 19/96
(Continued)

(56) References Cited

U.S. PATENT DOCUMENTS 6,909,744 B2 * 6/2005 Molloy .................. G06T 9/008
375/240.01
7,356,079 B2 * 4/2008 Laksono .............. H04N 19/176
375/240.03
(Continued)

OTHER PUBLICATIONS

Pan et al, A low-complexity screen compression scheme for interactive screen sharing, Jun. 3, 2013.*
(Continued)

*Primary Examiner* — Shan E Elahi
(74) *Attorney, Agent, or Firm* — Shumaker & Sieffert, P.A.

(57) ABSTRACT

In one example, a device for decoding video data includes a memory configured to store video data and a video decoder configured to determine that a value for a right shift parameter for an escape-mode coded pixel of a palette-mode coded block of the video data is less than zero, based on the value for the right shift parameter being less than zero, set a value for a left shift parameter to a positive value having an absolute value equal to an absolute value of the right shift parameter, and inverse quantize the escape-mode coded pixel using the value of the left shift parameter.

25 Claims, 6 Drawing Sheets

(51) Int. Cl.

| | |
|---|---|
| *G06F 9/30* | (2018.01) |
| *H04N 19/61* | (2014.01) |
| *H04N 19/593* | (2014.01) |
| *H04N 19/126* | (2014.01) |
| *H04N 19/105* | (2014.01) |
| *H04N 19/124* | (2014.01) |
| *H04N 19/139* | (2014.01) |
| *H04N 19/147* | (2014.01) |
| *H04N 19/176* | (2014.01) |
| *H04N 19/44* | (2014.01) |
| *H04N 19/52* | (2014.01) |
| *H04N 19/577* | (2014.01) |
| *H04N 19/96* | (2014.01) |

(52) U.S. Cl.
CPC ......... *H04N 19/124* (2014.11); *H04N 19/126* (2014.11); *H04N 19/13* (2014.11); *H04N 19/139* (2014.11); *H04N 19/147* (2014.11); *H04N 19/176* (2014.11); *H04N 19/44* (2014.11); *H04N 19/52* (2014.11); *H04N 19/577* (2014.11); *H04N 19/593* (2014.11); *H04N 19/61* (2014.11); *H04N 19/96* (2014.11)

(58) Field of Classification Search
USPC ................................................. 375/240.03
See application file for complete search history.

(56) References Cited

U.S. PATENT DOCUMENTS

| | | | | |
|---|---|---|---|---|
| 8,510,355 | B2 * | 8/2013 | Chen ................ | G06F 9/3001 708/209 |
| 9,189,237 | B2 * | 11/2015 | Chen ................ | G06F 9/3001 |
| 9,693,058 | B2 * | 6/2017 | Gamei ............... | H04N 19/122 |
| 2005/0013373 | A1 * | 1/2005 | Lin .................. | H04N 19/70 375/240.18 |
| 2006/0277235 | A1 * | 12/2006 | Jeong ................ | G06F 5/01 708/209 |
| 2007/0297504 | A1 * | 12/2007 | Reznik .............. | G06F 17/147 375/240 |
| 2007/0299897 | A1 * | 12/2007 | Reznik .............. | G06F 17/147 708/409 |
| 2008/0048893 | A1 * | 2/2008 | Xu ................... | H03M 7/4006 341/60 |
| 2009/0224950 | A1 * | 9/2009 | Xu ................... | H03M 7/4006 341/51 |
| 2010/0174765 | A1 * | 7/2010 | Jeong ................ | G06F 5/01 708/209 |
| 2011/0280303 | A1 * | 11/2011 | Regunathan ......... | H04N 19/70 375/240.08 |
| 2012/0299757 | A1 * | 11/2012 | Xu ................... | H03M 7/4018 341/107 |
| 2014/0140416 | A1 * | 5/2014 | Yamazaki ........... | H04N 19/70 375/240.25 |
| 2014/0286400 | A1 * | 9/2014 | Joshi ................ | H04N 19/70 375/240.03 |
| 2015/0264348 | A1 * | 9/2015 | Zou .................. | H04N 19/70 375/240.02 |
| 2015/0264365 | A1 * | 9/2015 | Tsai ................. | H04N 19/94 375/240.03 |
| 2015/0365670 | A1 * | 12/2015 | Chang ............... | H04N 19/119 375/240.02 |
| 2016/0100179 | A1 * | 4/2016 | He ................... | H04N 19/176 375/240.25 |
| 2017/0171560 | A1 * | 6/2017 | Kim .................. | H04N 19/593 |

OTHER PUBLICATIONS

Kuo et al, A low cost media processor based real time MPEG-4 video decoder (Year: 2003).*

"Shifts and Rotates," Jan. 1, 2007, XP055263894, Retrieved from the Internet on Apr. 8, 2016: URL:http://www.flexhex.com/docs/help/editing/shifts.phtml, 2 pp.

"TComRom.cpp in tags/HM-16.2+SCM-3.0/source/Lib/TLibCommon—JCT-VC HEVC," Nov. 11, 2014, XP055263040, Retrieved from the Internet on Apr. 5, 2016: URL:https://hevc.hhi.fraunhofer.de/trac/hevc/browser/tags/HM16.2%2BSCM-3.0/source/Lib/TLibCommon/TComRom.cpp, 14 pp.

"TComRom.h in tags/HM-16.2+SCM-3.0/source/Lib/TLibCommon—JCT-VC HEVC," Nov. 11, 2014, XP055263036, Retrieved from the Internet on Apr. 5, 2016: URL:https://hevc.hhi.fraunhofer.de/trac/hevc/browser/tags/HM-16.2%2BSCM-3.0/source/Lib/TLibCommon/TComRom.h, 5 pp.

"#560 (Intra Transform Skipping Semantic Issue with High bit-depth)—JCT-VC HEVC," Jul. 2, 2012, XP055263328, Retrieved from the Internet on Apr. 6, 2016: URL:https://hevc.hhi.fraunhofer.de/trac/hevc/ticket/560, 4 pp.

"TComPrediction.cpp in tags/HM-16.2+SCM-3.0/source/Lib/TLibCommon—JCT-VC HEVC," Nov. 15, 2014, XP055263033, 30 pp., Retrieved from the Internet on Apr. 5, 2016: URL:https://hevc.hhi.fraunhofer.de/trac/hevc/browser/tags/HM-16.2%62BSCM-3.0/source/Lib/TLibCommon/TComPrediction.cpp.

International Search Report and Written Opinion of International Application No. PCT/US2016/015672, dated Apr. 19, 2016, 15pp.

"Proof of Dates of Files in HM-16.2+SCM-3.0", Apr. 6, 2016, XP055264052, 7 pp.

Xiu et al., "Non-CE1: On Escape Color Coding for Palette Coding Mode," JCT-VC Meeting; Feb. 10-18, 2015; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-T0118, Jan. 31, 2015, XP030117264 10 pp.

Zou et al., "CE1 Related: On Escape Pixel Coding for Palette Mode," JCT-VC Meeting; Feb. 10-18, 2015; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-T0112-v3, Feb. 10, 2015, XP030117256, 9 pp.

Guo et al., "Non-RCE3: Modified Palette Mode for Screen Content Coding," JCT-VC of ITU-T SG 16 WP 3 and ISO/IEC JTC 1/SC 29/WG 11, JCTVC-N0249, 14th Meeting, Jul. 25-Aug. 2, 2013, Vienna, AT, Jul. 16, 2013, 6 pp.

Guo et al., "Palette Mode for Screen Content Coding," JCT-VC of ITU-T SG 13 WP 3 and ISO/IEC JTC 1/SC 29/WG 11, 13th Meeting, Apr. 18-26, 2013, JCTVC-M0323, Incheon, KR. Apr. 8, 2013, 5 pp.

Guo et al., "Palette Mode for Screen Content Coding," JCT-VC of ITU-T SG 13 WP 3 and ISO/IEC JTC 1/SC 29/WG 11, 13th Meeting, Apr. 18-26, 2013, JCTVC-M0323, Incheon, KR., Apr. 17, 2013, 6 pp.

Guo et al., "Palette Mode for Screen Content Coding," JCT-VC of ITU-T SG 13 WP 3 and ISO/IEC JTC 1/SC 29/WG 11, 13th Meeting, Apr. 18-26, 2013, JCTVC-M0323, Incheon, KR., Apr. 20, 2013, 12 pp.

Flynn et al., "High Efficiency Video Coding (HEVC) Range Extensions text specification: Draft 7", Joint Collaborative Team on Video Coding (JCT-VC) of ITU-T SG 16 WP 3 and ISO/IEC JTC 1/SC 29/WG 11, 17th Meeting, Mar. 27-Apr. 4, 2014, JCTVC_Q1005_V7, Valencia, ES, Jun. 10, 2014, 379 pp.

Response to Written Opinion dated Apr. 19, 2016, from International Application No. PCT/US2016/015672, dated Nov. 2, 2016, 6 pp.

Second Written Opinion of International Application No. PCT/US2016/015672, dated Dec. 15, 2016, 7 pp.

Joshi et al., "High Efficiency Video Coding (HEVC) Screen Content Coding: Draft 2", Joint Collaborative Team on Video Coding (JCT-VC) of ITU-T SG 16 WP 3 and ISO/IEC JTC 1/SC 29/WG 11, 18th Meeting, Jun. 30, Jul. 9, 2014, JCTVC-S1005, Sapporo, JP, 380 pp.

"The modification for section 8.6.4—Attachment to #560 (Intra transform skipping semantic issue with high bit-depth), JCT-VC HEVC", Jul. 2, 2012, Retrieved from the Internet on Dec. 9, 2016: URL: https:1/hevc.hhi.fraunhofer.de/trac/hevc/ticket/560, 5 pp.

ITU-T H.265, Series H: Audiovisual and Multimedia Systems, Infrastructure of audiovisual services—Coding of moving video,

(56) References Cited

OTHER PUBLICATIONS

Advanced video coding for generic audiovisual services, The International Telecommunication Union. Apr. 2015, 634 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
Yu, et al., "Common conditions for screen content coding tests," Joint Collaborative Team on Video Coding (JCT-VC) of ITU-T SG 16 WP 3 and ISO/IEC JTC 1/SC 29/WG 11, JCT-VC Meeting; Oct. 17-24, 2014, document No. JCTVC-S1015_r1, Nov. 21, 2014, 6 pp.
International Preliminary Report on Patentability dated Apr. 13, 2017 in International Application No. PCT/US2016/015672, 10 pp.

\* cited by examiner

CODING ESCAPE PIXELS FOR PALETTE MODE CODING

This application claims the benefit of U.S. Provisional Application No. 62/110,519, filed Jan. 31, 2015, which is hereby incorporated by reference in its entirety.

TECHNICAL FIELD

This disclosure relates to video coding, and more particularly, to coding video data using palette mode.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to quantizing values for escape-mode coded pixels of palette-mode coded blocks of video data. In particular, in some instances, conventional escape-mode coding techniques resulted in certain situations in which a binary value was to be right-shifted by a negative value. A bitwise shift operation by a negative value is generally an undefined operation, which may cause an error. The techniques of this disclosure may be used to correct such errors when they occur. In particular, the techniques of this disclosure may be used to change the shift value from negative to positive, and to perform a bitwise left shift operation, instead of a bitwise right shift operation.

In one example, a method includes determining that a value for a right shift parameter for an escape-mode coded pixel of a palette-mode coded block of video data is less than zero, based on the original value for the right shift parameter being less than zero, setting a value for a left shift parameter to a positive value having an absolute value equal to an absolute value of the original value, and inverse quantizing the escape-mode coded pixel using the value of the left shift parameter.

In another example, a device for decoding video data includes a memory configured to store video data and a video decoder configured to determine that a value for a right shift parameter for an escape-mode coded pixel of a palette-mode coded block of the video data is less than zero, based on the value for the right shift parameter being less than zero, set a value for a left shift parameter to a positive value having an absolute value equal to an absolute value of the right shift parameter, and inverse quantize the escape-mode coded pixel using the value of the left shift parameter.

In another example, a device for decoding video data includes means for determining that a value for a right shift parameter for an escape-mode coded pixel of a palette-mode coded block of video data is less than zero, means for setting, based on the value for the right shift parameter being less than zero, a value for a left shift parameter to a positive value having an absolute value equal to an absolute value of the right shift parameter, and means for inverse quantizing the escape-mode coded pixel using the value of the left shift parameter.

In another example, a computer-readable storage medium is encoded with instructions that, when executed, cause a programmable processor to determine that a value for a right shift parameter for an escape-mode coded pixel of a palette-mode coded block of the video data is less than zero, based on the value for the right shift parameter being less than zero, set a value for a left shift parameter to a positive value having an absolute value equal to an absolute value of the right shift parameter, and inverse quantize the escape-mode coded pixel using the value of the left shift parameter.

In another example, a method of encoding video data includes determining that a value for a left shift parameter for an escape-mode coded pixel of a palette-mode coded block of video data is less than zero, based on the value for the left shift parameter being less than zero, setting a value for a right shift parameter to a positive value having an absolute value equal to an absolute value of the left shift parameter, and quantizing the escape-mode coded pixel using the value of the left shift parameter.

The details of one or more examples are set forth in the accompanying drawings and the description below. Other features, objects, and advantages will be apparent from the description and drawings, and from the claims.

DETAILED DESCRIPTION

Figure 1:
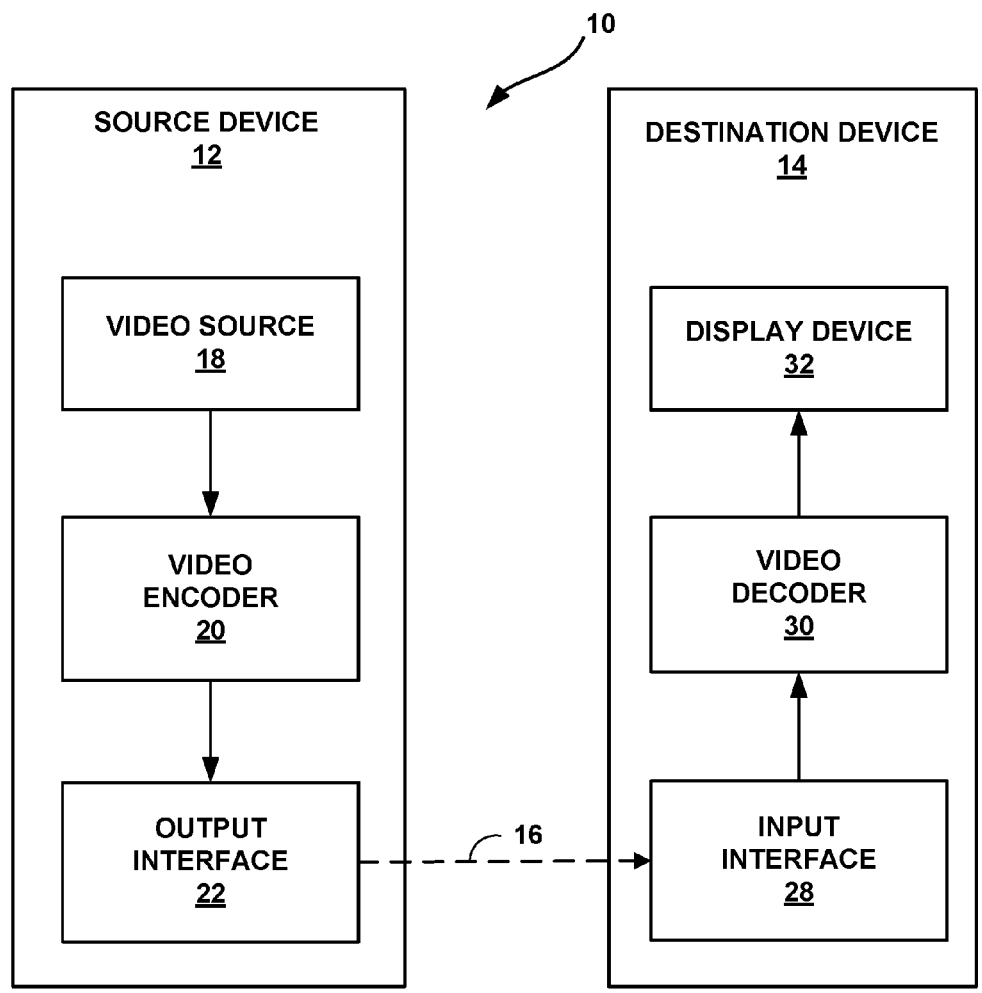
FIG. 1 is a block diagram illustrating an example video encoding and decoding system that may utilize techniques of this disclosure for coding escape pixels in palette-mode coded blocks.

In general, this application describes techniques for supporting coding of video content, especially screen content with palette mode coding. More particularly, these techniques relate to escape pixel coding for palette mode coding (also referred to as "palette coding").

In traditional video coding, images are assumed to be continuous-tone and spatially smooth. Based on these assumptions, various tools have been developed, such as block-based transform, filtering, etc., and such tools have shown good performance for natural content videos. In applications like remote desktop, collaborative work and wireless display, however, computer generated screen content (e.g., such as text or computer graphics) may be the dominant content to be compressed. This type of content tends to have discrete-tone, and feature sharp lines and high-contrast object boundaries. The assumption of continuous-tone and smoothness may no longer apply for screen content, and thus traditional video coding techniques may not be efficient ways to compress video data including screen content.

Based on the characteristics of screen content video, palette coding was introduced to improve screen content coding (SCC) efficiency, and was firstly proposed in Guo et al., "Palette Mode for Screen Content Coding," JCT-VC of ITU-T SG 13 WP 3 and ISO/IEC JTC 1/SC 29/WG 11, 13$^{th}$ Meeting, JCTVC-M0323, Incheon, K R. 18-26 Apr. 2013. Specifically, palette coding introduces a lookup table, i.e., color palette, to compress repetitive pixel values based on the fact that in SCC, colors within one coding unit (CU) usually concentrate on a few peak values. Given a palette for a specific CU, pixels within the CU are mapped to the palette index. In the second stage, an effective copy from left run length method is proposed to effectively compress the index block's repetitive pattern. Later, in Guo et al., "Non-RCE3: Modified Palette Mode for Screen Content Coding," JCT-VC of ITU-T SG 16 WP 3 and ISO/IEC JTC 1/SC 29/WG 11, JCTVC-N0249, 14$^{th}$ Meeting, Vienna, A T, 25 Jul.-2 Aug. 2013, the palette index coding mode was generalized to both copy from left and copy from above with run length coding. Note that no transformation process is invoked for palette coding to avoid blurring sharp edges which has huge negative impact on visual quality of screen contents.

A palette is a data structure that stores {index, pixel value} pairs. A video encoder may determine a palette, e.g., based on a histogram of pixel values in a current CU. For example, peak values in the histogram may be added into the palette, while low frequency pixel values need not be included in the palette. Palette size may be restricted to be in the range of 0 to max_palette_size equal to 31.

For SCC, CU blocks within one slice may share many dominant colors. Therefore, it is possible to predict a current block's palette using previous palette mode CUs' palettes (in CU decoding order) as reference. Specifically, a 0-1 binary vector may be signaled to indicate whether the pixel values in the reference palette is reused by the current palette or not. As an example, in Tables 1 and 2 below, it is assumed that the reference palette has 6 items. A vector (1, 0, 1, 1, 1, 1) is signaled with the current palette which indicates that v0, v2, v3, v4, and v5 are re-used in the current palette while v1 is not re-used. If the current palette contains colors which are not predictable from a reference palette, the number of unpredicted colors is coded and then these pixel values (e.g., luma or chroma values) are directly signaled. For example, in Tables 1 and 2, u0 and u1 are directly signaled into the bitstream.

TABLE 1

| Reference Palette | |
|---|---|
| Index | Pixel Value |
| 0 | $V_0$ |
| 1 | $V_1$ |
| 2 | $V_2$ |
| 3 | $V_3$ |
| 4 | $V_4$ |
| 5 | $V_5$ |

TABLE 2

| Current Palette | | |
|---|---|---|
| Prediction Flag | Index | Pixel Value |
| 1 | 0 | $V_0$ |
| 0 | | |
| 1 | 1 | $V_2$ |
| 1 | 2 | $V_3$ |
| 1 | 3 | $V_4$ |
| | 4 | $V_5$ |
| | 5 | $U_0$ |
| | 6 | $U_1$ |

For the block coded with the palette mode, the palette can be predicted from the palette entries of the previously palette coded blocks, can be explicitly signaled as a new entries or the palette of the previously coded block can be completely reused. The latter case is called palette sharing and a flag palette_share_flag is signaled to indicate that the entire palette of the previous block is reused without modification as is. Examples of a reference palette and a current palette are shown in Tables 1 and 2 above. In particular, Table 1 illustrates an example reference palette, and Table 2 illustrates an example current palette that can be predicted from the reference palette of Table 1.

In the current SCM3.0 reference software, the two primary aspects of palette coding from a normative perspective are the coding of the palette and coding of the palette index for each sample in the block being coded in the palette mode. The coding of palette indices is performed using two primary modes, 'index' mode and 'copy above' mode. This is signaled by coding a palette_mode flag. The 'index' mode is also used to indicate escape samples, i.e., samples that do not belong to the palette. In the current design, a 'copy above' mode is not possible for the first row of the palette block. In addition, a 'copy above' mode may not follow another 'copy above' mode. In these cases, an 'index' mode is inferred.

Specifically, for palette mode, pixels in the CU are encoded in a horizontal/vertical snake scan order as follows:

1. "Index" mode: In this mode, one palette index is first signaled. If the index is equal to the size of the palette, this indicates that the sample is an escape sample. In this case, the sample value or quantized samples value for each component (e.g., luma and chroma) is signaled. For example, if the palette size is 4, for non-escape samples, the palette indices are in the range [0, 3]. In this case, an index value of 4 signifies an escape sample. If the index indicates a non-escape sample, run-length is signaled, which specifies the number of subsequent samples in scanning order that share the same index, by a non-negative value n−1 indicating the run length, which means that the following n pixels including the current one have the same pixel index as the first signaled one.
2. "Copy from Above" run mode (CA): In this mode, only a non-negative run length value m−1 is transmitted to indicate that for the following m pixels including the current one, palette indexes are the same as their neighbors directly above, respectively. Note that this mode is different from "Index" mode, in the sense that the palette indices could be different within the Copy from Above run mode.

In the current design, the palette mode is signalled at a CU level, but it may be possible to signal it at a PU level. A flag, palette_esc_val_present_flag, is also signalled to indicate the presence of escape samples in a current block.

In the palette mode, the pixel scanning in the block can be of two types: vertical traverse or horizontal traverse (snake like) scanning. The scanning pattern used in the block is derived according to the flag palette_transpose_flag signaled per block unit.

During palette index coding, the palette index adjustment process can be applied. Starting from the second pixel in the block, it consists of checking the palette mode of the previously coded pixel. First, the palette size is reduced by 1, and if the left mode is equal to the Run mode, then the palette index to be coded is reduced by 1 if the index is greater than the left palette index, or if the left mode is Copy mode, then the palette index to be coded is reduced by 1 if the index is greater than the above palette index. The description is provided from the encoding side, and the corresponding process can be performed in the reverse order at decoder side as well.

In SCM-3.0, the following syntax optimizations were adopted:

If palette size is 0, all escapes pixels are derived and no escape present flag, palette mode, palette index, palette run, and palette transpose flag are signaled, and the escape present flag is inferred to be equal to 1, the palette mode is inferred to be equal to the INDEX mode, palette index is set equal to the ESCAPE, palette run value is set equal to the block size, and the palette transpose flag is set to 0.

If palette size is 1 and no escape pixels are used in the block, then no palette mode, palette run, or palette transpose flag are signaled, and palette mode is derived to be equal to the INDEX mode, palette index is set to 0, palette run value is set equal to the block size, and the palette transpose flag is set to 0.

This disclosure describes techniques related to palette-based coding, which may be particularly suitable for screen generated content coding. For example, assuming that a particular area of video data has a relatively small number of colors, a video coder (e.g., a video encoder or video decoder) may form a so-called "palette" to represent the video data of the particular area. The palette may be expressed as a table of colors or pixel values representing the video data of the particular area (e.g., a given block). For example, the palette may include the most dominant pixel values in the given block. In some cases, the most dominant pixel values may include the one or more pixel values that occur most frequently within the block. Additionally, in some cases, a video coder may apply a threshold value to determine whether a pixel value is to be included as one of the most dominant pixel values in the block. According to various aspects of palette-based coding, the video coder may code index values indicative of one or more of the pixels values of the current block, instead of coding actual pixel values or their residuals for a current block of video data. In the context of palette-based coding, the index values indicate respective entries in the palette that are used to represent individual pixel values of the current block.

For example, the video encoder may encode a block of video data by determining the palette for the block (e.g., coding the palette explicitly, predicting the palette, or a combination thereof), locating an entry in the palette to represent one or more of the pixel values, and encoding the block with index values that indicate the entry in the palette used to represent the pixel values of the block. In some examples, the video encoder may signal the palette and/or the index values in an encoded bitstream. In turn, the video decoder may obtain, from an encoded bitstream, a palette for a block, as well as index values for the individual pixels of the block. The video decoder may relate the index values of the pixels to entries of the palette to reconstruct the various pixel values of the block.

More particularly, pixels of a block coded using palette mode may be coded using an "index" mode, in which a pixel is coded using a reference to the palette, or a copy from above mode, in which the pixel is coded using a reference to an above-neighboring pixel. A third option is to code the pixel as an escape pixel. In this case, the value of the pixel (or a quantized value for the pixel) is signaled directly.

In the current SCM3.0 as of the time of this disclosure, dequantization is used to reconstruct quantized escape pixels in palette mode. Specifically, the following procedure is used to reconstruct the escape pixels:

1. A quantization parameter qP is derived according to different color component index (cIdx) values as follows:

$qP=(cIdx==0)?Qp'Y:((cIdx==1)?Qp'Cb:Qp'Cr)$

2. A quantization ratio qPper and a quantization remainder qPrem are derived as follows:

$qPper=qP/6$ $qPrem=qP\%6$

3. A right shift parameter invQuantRightShift and an offset parameter addOffset derived as follows:

$invQuantRightShift=6-qPper$ $addOffset=invQuantRightShift==0?0:1<<(invQuantRightShift-1)$ 4. A dequantized escape pixel deQuantEspValue is derived based on entropy decoded EspValue as follows $deQuantEspValue=(EspValue*invQuantScale[qPrem]+addOffset)>>invQuantRightShift$ 5. deQuantEspValue is further modified to be in the depth range as follows $$\text{deQuantEspValue} = \text{clip3}(0, 2^{bitDepth} - 1, \text{deQuantEspValue})$$

One problem that may be encountered in the current design of SCM3.0 is that, when qPper is larger than 6, invQuantRightShift is negative. There is no definition of right shift by a negative number. Thus, this scenario may cause different interpretation of dequantization for different decoders, which is not desirable for a practical design.

In accordance with techniques of this disclosure, video coders (e.g., video encoders and video decoders) may be configured to avoid the problem described above. In particular, video coders may be configured to address the full range of quantization parameter (qP) values. For instance, qP can be in the range of [0, 1, . . . , 51] inclusive. And different dequantization processes may be used to reconstruct the escape pixels for palette mode. These and other techniques are described in greater detail below.

FIG. 1 is a block diagram illustrating an example video encoding and decoding system 10 that may utilize techniques of this disclosure for coding escape pixels in palette-mode coded blocks. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding escape pixels in palette-mode coded blocks. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding escape pixels in palette-mode coded blocks may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction, or palette mode) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS). Video decoder 30 may use these parameters to decode video data.

In accordance with the techniques of this disclosure, video encoder 20 may perform the following process to quantize an escape pixel value during palette mode coding:

1. A quantization parameter qP is derived according to different color component index (cIdx) values as follows:

$qP=(cIdx==0)?Qp'Y:((cIdx==1)?Qp'Cb:Qp'Cr)$

2. Video encoder 20 derives a quantization ratio qPper and a quantization remainder qPrem as follows:

$qPper=qP/6$ $qPrem=qP\%6$

3. Video encoder 20 derives a right shift parameter quantRightShift and an offset parameter Offset as follows:

quantRightShift=14−$qPper$

Offset=1<<(quantRightShift−1)

4. The dequantized escape pixel value is derived as follows

EspValue=(pixelValue*quantScale[$qPrem$]+ Offset)>>quantRightShift

Likewise, as a reciprocal process, video decoder 30 may perform the following process to inverse quantize (or dequantize) an escape pixel value during palette mode coding:

1. Video decoder 30 derives a quantization parameter qP according to different color component index (cIdx) values as follows:

$qP=(cIdx==0)?Qp'Y:((cIdx==1)?Qp'Cb:Qp'Cr)$

2. Video decoder 30 derives a quantization ratio qPper and a quantization remainder qPrem as follows:

$qPper=qP/6$ $qPrem=qP\%6$

3. Video decoder 30 derives a right shift parameter invQuantRightShift and an offset parameter addOffset as follows:

invQuantRightShift=6−$qPper$ addOffset=invQuantRightShift==0?0:1<<(invQuantRightShift−1)

4A. If invQuantRightShift is larger than 0, video decoder 30 performs the following procedure:

deQuantEspValue=(EspValue*invQuantScale [$qPrem$]+addOffset)>>invQuantRightShift 4B. Otherwise (invQuantRightShift<=0), video decoder 30 performs the following procedure:

invQuantLeftShift=−invQuantRightShift deQuantEspValue=EspValue*invQuantScale[$qPrem$] <<invQuantLeftShift 5. Video decoder 30 further modifies deQuantEspValue to be in the depth range as follows:

deQuantEspValue=clip3(0,$2^{bitDepth}$−1,deQuantEspValue)

quantScale[.] and invQuantScale[.] may be lookup tables (e.g., implemented as arrays) that may be {26214, 23302, 20560, 18396, 16384, 14564}, {40, 45, 51, 57, 64, 72} respectively, or another lookup table (or array) of 6 entries when Adaptive Quantization Scaling is enabled. For example, when Adaptive Quantization Scaling is enabled, video decoder 30 may adjust invQuantRightShift and/or invQuantLeftShift to normalize the scaling factor introduced by Adaptive Quantization Scaling.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
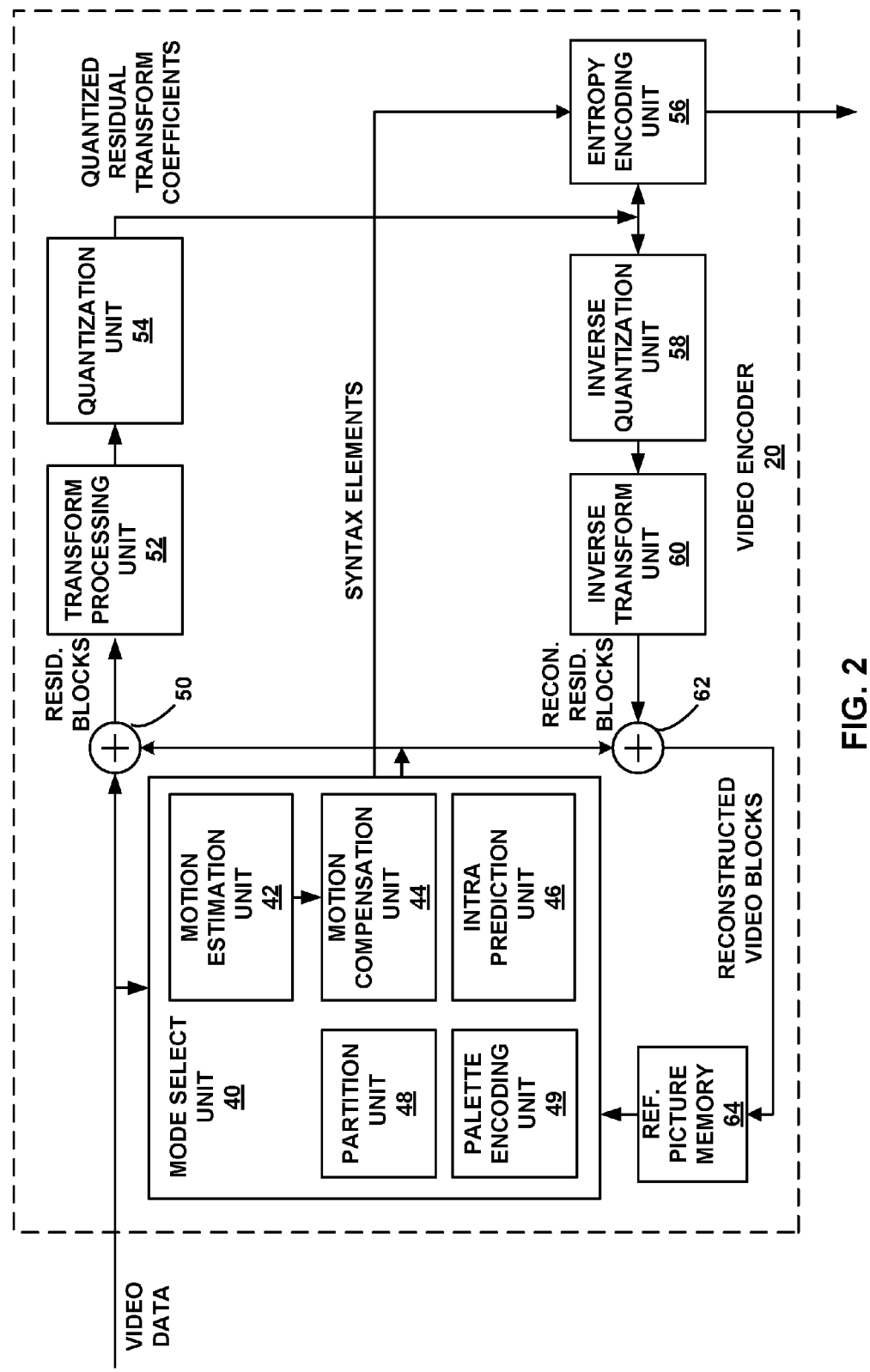
FIG. 2 is a block diagram illustrating an example of a video encoder that may implement techniques for encoding escape pixels in palette-mode coded blocks in accordance with the techniques of this disclosure.

FIG. 2 is a block diagram illustrating an example of video encoder 20 that may implement techniques for encoding escape pixels in palette-mode coded blocks in accordance with the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, palette-mode encoding unit 49, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. In addition, mode select unit 40 may select palette mode as an alternative to intra- and inter-prediction modes. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

In accordance with the techniques of this disclosure, video encoder 20 may be configured to perform palette-based coding. More particularly, palette encoding unit 49 may perform palette mode encoding of a block (e.g., a CU or a PU) of video data. With respect to the HEVC framework, as an example, the palette-based coding techniques may be configured to be used as a CU mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to a PU mode. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks, or even regions of non-rectangular shape.

Palette encoding unit 49, for example, may perform palette-based encoding when a palette-based encoding mode is selected, e.g., for a CU or PU. For example, palette encoding unit 49 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette encoding unit 49, some or all of such functions may be performed by other processing units, or a combination of different processing units.

According to one or more of the techniques of this disclosure, video encoder 20, and specifically palette encoding unit 49, may perform palette-based video coding of predicted video blocks. As described above, a palette generated by video encoder 20 may be explicitly encoded, predicted from previous palette entries, predicted from previous pixel values, or a combination thereof.

In particular, mode select unit 40 may determine an encoding mode for a block (e.g., a CU or PU) of video data, such as inter-prediction, intra-prediction, or palette mode. Assuming palette mode is selected, palette encoding unit 49 may form a palette for the block based on statistics of pixel values for the block. For each pixel of the block, palette encoding unit 49 may determine whether the pixel has a corresponding value in the palette, and if so, signal an index into the palette to the corresponding value for the pixel.

Palette encoding unit 49 may also signal a run value, representing a number of pixels having the same value as the previous pixel.

Alternatively, if a sequence of pixels has values equal to above-neighboring pixels, palette encoding unit 49 may signal a run value for "copy-from-above" mode, where the run represents the number of pixels having values equal to above-neighboring pixels.

If neither the index mode nor the copy-from-above mode adequately represents the value of a current pixel of the palette-mode coded block, palette encoding unit 49 may use the techniques of this disclosure to code the pixel as an escape pixel. That is, these techniques may be performed to quantize an escape pixel value, where the escape pixel value represents the actual value of the pixel (e.g., luma and/or chroma values) being coded. In accordance with the techniques of this disclosure, video encoder 20 may quantize the value of the pixel to be coded as an escape pixel, e.g., as discussed above with respect to FIG. 1. That is, palette encoding unit 49 may perform the following quantization process:

1. Palette encoding unit 49 derives qP according to different color component index cIdx as follows:

$qP=(cIdx==0)?Qp'Y:((cIdx==1)?Qp'Cb:Qp'Cr)$

2. Palette encoding unit 49 derives a quantization ratio qPper and a quantization remainder qPrem as follows:

$qPper=qP/6$ $qPrem=qP\%6$

3. Palette encoding unit 49 derives a right shift parameter invQuantRightShift and an offset parameter addOffset as follows:

$invQuantRightShift=6-qPper$ $addOffset=invQuantRightShift==0?0:1<<(invQuantRightShift-1)$ 4. Palette encoding unit 49 derives a dequantized escape pixel deQuantEspValue based on entropy decoded EspValue as follows:

$deQuantEspValue=(EspValue*invQuantScale[qPrem]+addOffset)>>invQuantRightShift$

5. Palette encoding unit 49 further modifies deQuantEspValue to be in the depth range as follows:

$deQuantEspValue=clip3(0,2bitDepth-1,deQuantEspValue)$

In this example, "EspValue" represents the quantized escape value for the pixel having an original value represented by "pixelValue."

In this manner, video encoder 20 of FIG. 2 represents an example of a video encoder configured to determine that a value for a left shift parameter for an escape-mode coded pixel of a palette-mode coded block of video data is less than zero, based on the value for the left shift parameter being less than zero, set a value for a right shift parameter to a positive value having an absolute value equal to an absolute value of the left shift parameter, and quantize the escape-mode coded pixel using the value of the left shift parameter.

Figure 3:
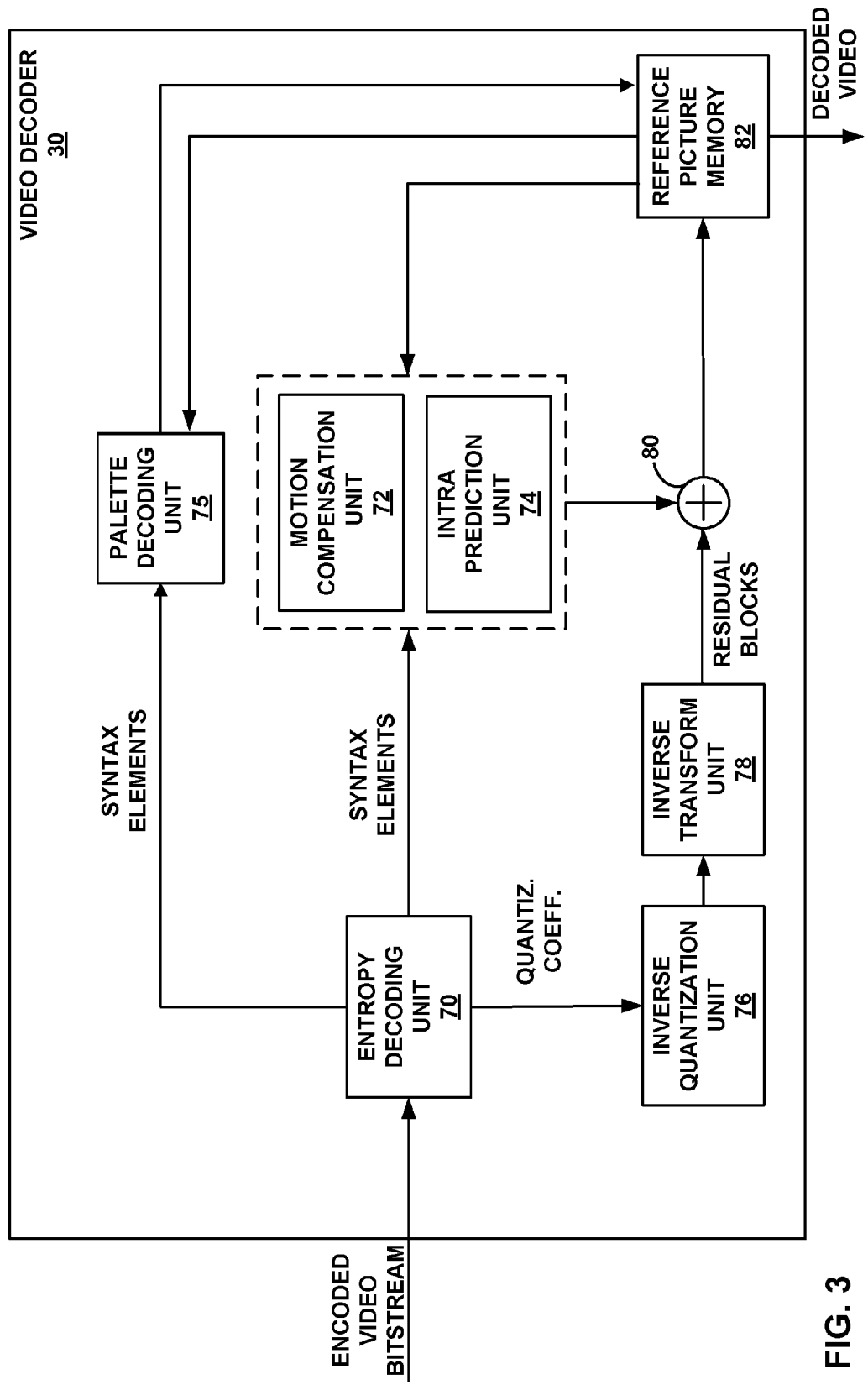
FIG. 3 is a block diagram illustrating an example of a video decoder that may implement techniques for decoding escape pixels in palette-mode coded blocks in accordance with the techniques of this disclosure.

FIG. 3 is a block diagram illustrating an example of video decoder 30 that may implement techniques for decoding escape pixels in palette-mode coded blocks in accordance with the techniques of this disclosure. In the example of FIG. 3, video decoder 30 includes an entropy decoding unit 70, motion compensation unit 72, intra prediction unit 74, palette decoding unit 75, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In accordance with various examples of this disclosure, video decoder 30 may be configured to perform palette-based decoding. In particular, video decoder 30 includes palette decoding unit 75 that may perform palette-based decoding. For example, palette decoding unit 75 may be configured to generate a palette having entries indicating pixel values. Furthermore, in this example, palette decoding unit 75 may receive information, such as the syntax elements shown in FIG. 3, associating at least some positions of a block of video data with entries in the palette. In this example, palette decoding unit 75 may select pixel values in the palette based on the information. Additionally, in this example, palette decoding unit 75 may reconstruct pixel values of the block based on the selected pixel values. Although various functions are described as being performed by palette decoding unit 75, some or all of such functions may be performed by other processing units, or a combination of different processing units.

Palette decoding unit 75 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette decoding unit 75 decodes the block of video data using a non-palette based coding mode, e.g., such as an HEVC inter-predictive or intra-predictive coding mode, when the palette coding mode information indicates that the palette coding mode does not apply to the block. The block of video data may be, for example, a CU or PU generated according to an HEVC coding process. Video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

According to one or more of the techniques of this disclosure, video decoder 30, and specifically palette decoding unit 75, may perform palette-based video decoding of palette-coded video blocks. As described above, a palette decoded by video decoder 30 may be explicitly encoded and signaled, reconstructed by video decoder 30 with respect to a received palette-coded block, predicted from previous palette entries, predicted from previous pixel values, or a combination thereof.

In particular, entropy decoding unit 150 may decode information indicating that a block (e.g., a PU or CU) of video data is coded using palette mode. Entropy decoding unit 150 may further decode information representative of how each pixel of the block is coded using palette mode. For example, entropy decoding unit 150 may decode an index value and a run value as an {index, run} pair. The index value represents an entry of the palette for the block, where the entry specifies a pixel value, and the run value indicates a number of pixels in addition to the current pixel that have the same value.

If the index value is equal to the size of the palette, entropy decoding unit 150 may determine that the current pixel is an escape pixel. Thus, entropy decoding unit 150 may entropy decode a value representative of the escape pixel. In particular, entropy decoding unit 150 may decode a quantized escape pixel value for the escape pixel. Entropy decoding unit 150 may then pass the quantized escape pixel value to palette decoding unit 75.

In accordance with the techniques of this disclosure, palette decoding unit 75 may dequantize the quantized escape pixel value. To dequantize the quantized escape pixel value, palette decoding unit 75 may perform the following process:

1. Palette decoding unit 75 derives a quantization parameter qP according to different color component index cIdx as follows:

$qP=(cIdx==0)?Qp'Y:((cIdx==1)?Qp'Cb:Qp'Cr)$

2. Palette decoding unit 75 derives a quantization ratio qPper and a quantization remainder qPrem as follows:

$qPper=qP/6$ $qPrem=qP\%6$

3. Palette decoding unit 75 derives a right shift parameter invQuantRightShift and an offset parameter addOffset as follows:

$invQuantRightShift=6-qPper$ $addOffset=invQuantRightShift==0?0:1<<(invQuantRightShift-1)$ 4A. If invQuantRightShift is larger than 0, palette decoding unit 75 performs the following procedure:

$deQuantEspValue=(EspValue*invQuantScale[qPrem]+addOffset)>>invQuantRightShift$

4B. Otherwise (invQuantRightShift<=0), palette decoding unit 75 performs the following procedure:

$invQuantLeftShift=invQuantRightShift$ $deQuantEspValue=EspValue*invQuantScale[qPrem]<<invQuantLeftShift$ 5. Palette decoding unit 75 further modifies deQuantEspValue to be in the depth range as follows:

$deQuantEspValue=clip3(0,2^{bitDepth}-1,deQuantEspValue)$

The invQuantScale[.] lookup table may be implemented as an array having entries {40, 45, 51, 57, 64, 72}, or another lookup table of, e.g., 6 entries, and may be used when Adaptive Quantization Scaling is enabled. For example, when Adaptive Quantization Scaling is enabled, video decoder 30 may adjust invQuantRightShift and/or invQuantLeftShift to normalize the scaling factor introduced by Adaptive Quantization Scaling.

In this manner, video decoder 30 of FIG. 3 represents an example of a video decoder configured to determine that a value for a right shift parameter for an escape-mode coded pixel of a palette-mode coded block of the video data is less than zero, based on the original value for the right shift parameter being less than zero, set a value for a left shift parameter to a positive value having an absolute value equal to an absolute value of the original value, and inverse quantize the escape-mode coded pixel using the value of the left shift parameter.

Figure 4:
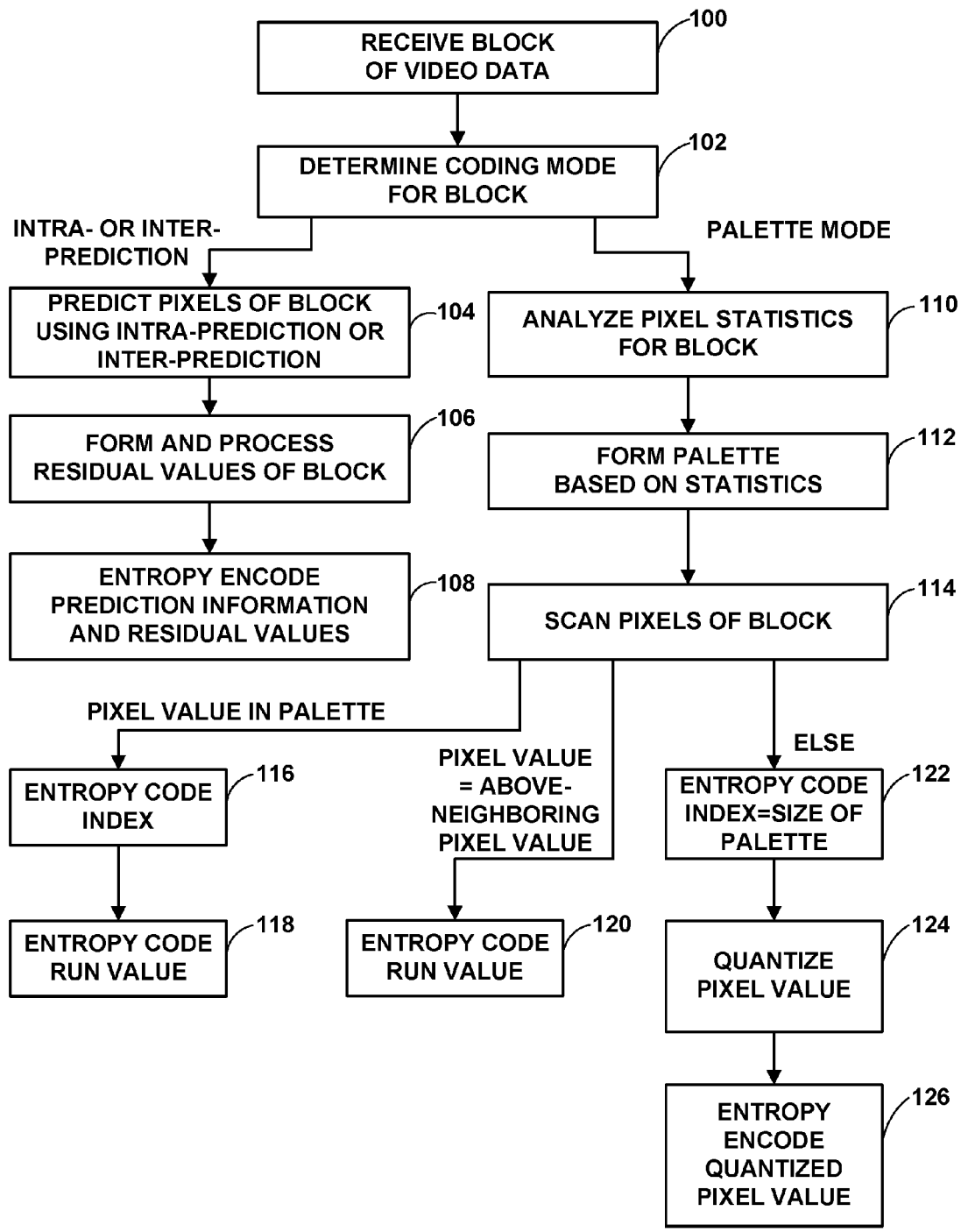
FIG. 4 is a flowchart illustrating an example method for encoding a block of video data in accordance with the techniques of this disclosure.

FIG. 4 is a flowchart illustrating an example method for encoding a block of video data in accordance with the techniques of this disclosure. The method of FIG. 4 may be performed by video encoder 20 and the components thereof (e.g., illustrated in FIG. 2).

In this example, mode select unit 40 initially receives a block of video data (100). The block may be, for example, a prediction unit (PU) or a coding unit (CU). Mode select unit 40 then determines a coding mode for the block (102). For example, mode select unit 40 may test various coding modes and compare the modes using a rate-distortion optimization (RDO) process. Furthermore, mode select unit 40 may also compare various block sizes and block partitioning schemes using the RDO process.

Mode select unit 40 may select an intra- or inter-prediction mode, in which case motion estimation unit 42 and motion compensation unit 44 or intra prediction unit 46 may predict pixels of the block using intra-prediction or inter-prediction (104), respectively, forming a predicted block. Video encoder 20 may then form and process residual values of the block (106). For example, residual generation unit 50 may subtract the original block from the predicted block on a pixel-by-pixel basis, forming a residual block. Transform processing unit 52 may then transform the residual block using a transform such as, for example, a DCT, forming a transform block. Quantization unit 54 may then quantize transform coefficients of the transform block, and provide the quantized transform coefficients to entropy encoding unit 56. Mode select unit 40 also provides information representative of the prediction mode (e.g., intra/inter, a selected intra mode if intra-prediction is used, or motion parameters if inter-prediction is used) to entropy encoding unit 56. Thus, entropy encoding unit 56 entropy encodes the prediction information and the residual values (i.e., the quantized transform coefficients) (108).

Alternatively, mode select unit 40 may select palette mode to code the block, in which case palette encoding unit 49 analyzes pixel statistics for the block (110). For example, palette encoding unit 49 may determine frequently used pixel values. Palette encoding unit 49 then forms a palette for the block based on the statistics (112). Although not shown in FIG. 4, entropy encoding unit 56 may entropy encode data for the palette. For example, the palette may be predictively coded relative to a previously used palette, e.g., as discussed above with respect to Tables 1 and 2.

Palette encoding unit 49 may then scan pixels of the block (114) to determine how to code the pixels. For example, palette encoding unit 49 may determine whether a current pixel value is included in the palette. If the pixel value is included in the palette, palette encoding unit 49 may provide an index from the palette that corresponds to the pixel value to entropy encoding unit 56, which may entropy encode the index value (116). Moreover, palette encoding unit 49 may determine a number of pixels in a row following the previous pixel that have the same value, and provide a "run" value to entropy encoding unit 56, which may entropy encode the run value (118).

Alternatively, if the current pixel does not have a value in the palette, palette encoding unit 49 may determine whether the value for the pixel is the same as an above-neighboring pixel value. In some examples, this determination may be made prior to determining whether the pixel value corresponds to a value in the palette. In any case, if the current pixel has a value that is equal to an above-neighboring pixel value, palette encoding unit 49 may provide a run value describing a number of pixels that have values equal to their above-neighboring pixels to entropy encoding unit 56, which may entropy encode the run value (120).

If the current pixel does not correspond to a value in the palette and does not have a value equal to an above-neighboring pixel, palette encoding unit 49 may encode the pixel as an escape pixel. In particular, palette encoding unit 49 may provide an index value equal to the size of the palette to entropy encoding unit 56, which may entropy code the index value as the size of the palette (122). An index value equal to the size of the palette may signal that the current pixel is being encoded as an escape pixel. Palette encoding unit 49 may further provide the value of the escape pixel to entropy encoding unit 56.

In accordance with the techniques of this disclosure, palette encoding unit 49 may quantize the pixel value (124). Quantization of the pixel value may generally include a bitwise shift operation. In particular, as explained above, if palette encoding unit 49 determines during quantization that a left shift parameter is less than or equal to zero, palette encoding unit 49 may instead perform a bitwise right-shift using a right shift parameter having an absolute value equal to the absolute value of the left shift parameter, but also having a positive value. Palette encoding unit 49 may then provide the quantized escape pixel value to entropy encoding unit 56, which may entropy encode the quantized pixel value (126).

Video encoder 20 may perform this process (e.g., one of the sequence of steps 116 and 118, step 120, or the sequence of steps 122-126) for each pixel of the palette mode coded block.

In this manner, the method of FIG. 4 represents an example of a method of encoding video data including determining that a value for a left shift parameter for an escape-mode coded pixel of a palette-mode coded block of video data is less than zero, based on the value for the left shift parameter being less than zero, setting a value for a right shift parameter to a positive value having an absolute value equal to an absolute value of the left shift parameter, and quantizing the escape-mode coded pixel using the value of the left shift parameter.

Figure 5:
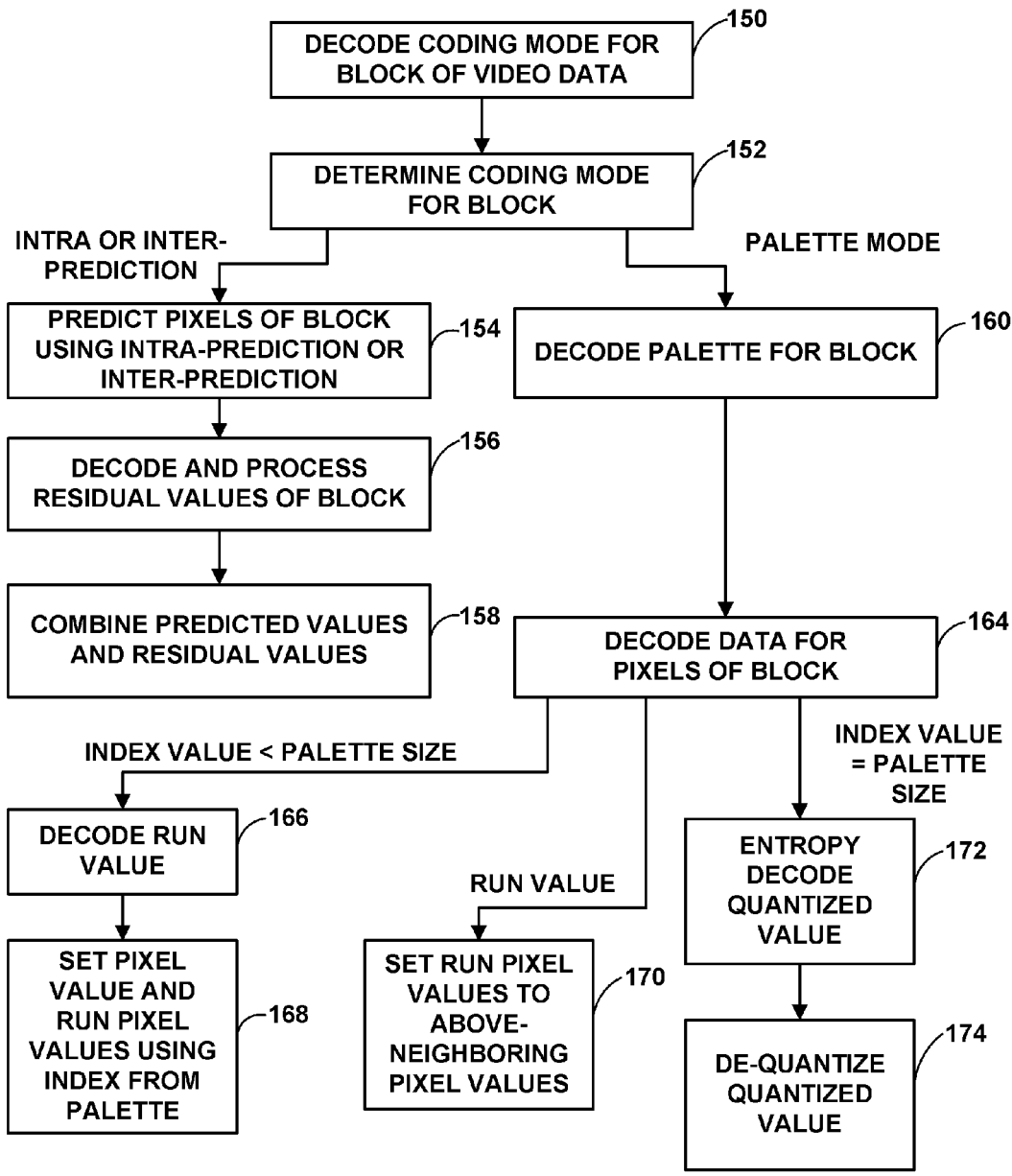
FIG. 5 is a flowchart illustrating an example method for decoding a block of video data in accordance with the techniques of this disclosure.

FIG. 5 is a flowchart illustrating an example method for decoding a block of video data in accordance with the techniques of this disclosure. The method of FIG. 5 may be performed by video decoder 30 and the components thereof (e.g., illustrated in FIG. 3).

Initially, entropy decoding unit 70 may decode data indicating a coding mode for a block of video data (150). Entropy decoding unit 70 may use this data to determine a coding mode for the block (152), e.g., one of intra-prediction, inter-prediction, or palette mode.

In the case that the coding mode is intra-prediction or inter-prediction, entropy decoding unit 70 may decode prediction information (e.g., an intra-mode or motion parameters) and provide the prediction information to an appropriate one of motion compensation unit 72 or intra prediction unit 74 to perform intra-prediction or inter-prediction (154). For example, intra prediction unit 74 may use an intra-prediction mode to construct a prediction block from neighboring pixels to the block. As another example, motion compensation unit 72 may use the motion parameters to retrieve (and potentially process, e.g., filter) a reference block from a previously decoded picture of reference picture memory 82.

In addition, video decoder 30 may decode and process residual values of the block (156). For example, inverse quantization unit 76 may inverse quantize quantized transform coefficients, and inverse transform unit 78 may inverse transform the transform coefficients, to reconstruct a residual block. Summer 80 may then combine residual values of the residual block and predicted values of the predicted block (158) to reconstruct the original block.

Alternatively, entropy decoding unit 70 may determine that the coding mode for the block is palette mode. In this case, entropy decoding unit 70 may entropy decode data for a palette of the block, while palette decoding unit 75 may decode the palette for the block (160) using the entropy decoded data. As discussed above with respect to Tables 1 and 2, the palette may be predictively coded relative to a previous palette. Thus, entropy decoding unit 70 may provide entropy decoded data for the palette to palette decoding unit 75, which may reconstruct the palette for the block using the decoded data.

Entropy decoding unit 70 may also decode data for pixels of the block (164). For example, the decoded data may correspond to an index value that is less than the size of the palette. In this case, entropy decoding unit 70 may also decode a run value (166) and provide the index and the run value to palette decoding unit 75. Palette decoding unit 75 may set the value of the pixel and each of the pixels in the run equal to the pixel value of the palette that corresponds to the index value (168).

As another example, the decoded data may be a run value without an index value. Such a run value without an index value may indicate a number of pixels coded using copy from above mode. In this case, entropy decoding unit 70 may provide the run value to palette decoding unit 75, which may set values for each of the pixels in the run equal to the values of respective above-neighboring pixel values (170).

As another example, the decoded data may be an index value that is equal to the size of the palette. In this case, entropy decoding unit 70 may determine that the current pixel is encoded as an escape pixel. Thus, entropy decoding unit 70 may entropy decode a quantized value for the escape pixel (172), and provide the quantized value to palette decoding unit 75. Palette decoding unit 75, in turn, may de-quantize the quantized value (174). In particular, palette decoding unit 75 may de-quantize the quantized value using the techniques of this disclosure, e.g., as explained in greater detail above and with respect to FIG. 6 below.

Video decoder 30 may perform this process (e.g., one of the sequence of steps 166 and 168, step 170, or the sequence of steps 172 and 174) for each pixel of the palette mode coded block, thereby decoding the palette mode coded block.

In this manner, the method of FIG. 5 represents an example of a method including determining that a value for a right shift parameter for an escape-mode coded pixel of a palette-mode coded block of video data is less than zero, based on the original value for the right shift parameter being less than zero, setting a value for a left shift parameter to a positive value having an absolute value equal to an absolute value of the original value, and inverse quantizing the escape-mode coded pixel using the value of the left shift parameter.

Figure 6:
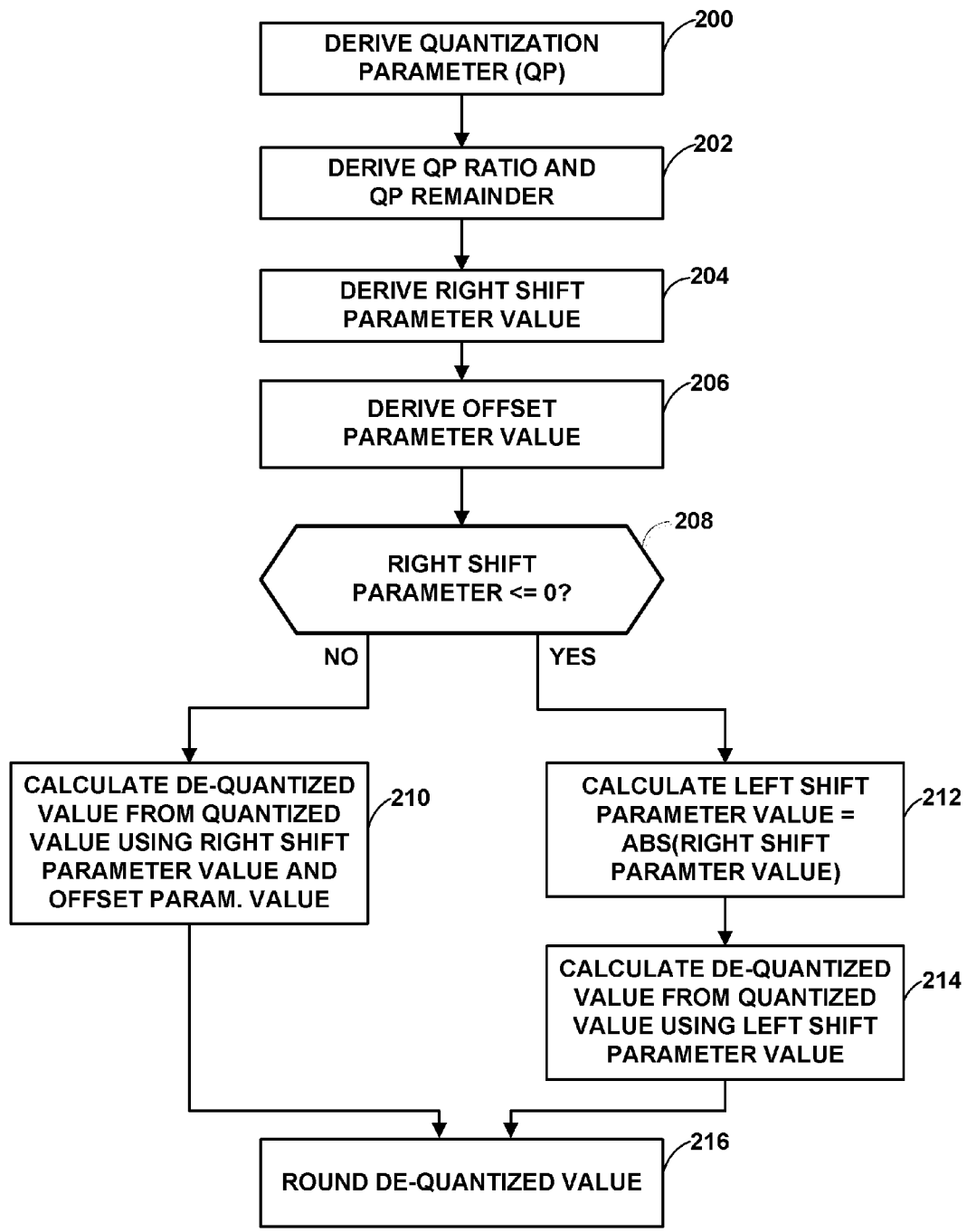
FIG. 6 is a flowchart illustrating an example technique by which a palette decoding unit may dequantize a quantized escape pixel value of a palette-mode encoded block of video data, in accordance with the techniques of this disclosure.

FIG. 6 is a flowchart illustrating an example technique by which palette decoding unit 75 may dequantize a quantized escape pixel value of a palette-mode encoded block of video data, in accordance with the techniques of this disclosure. In general, the method of FIG. 6 may correspond to element 174 of FIG. 5. That is, FIG. 6 represents one example of a method of dequantizing a quantized escape pixel value of a palette-mode encoded block of video data. The steps shown in FIG. 6 need not necessarily be performed in the order shown, and certain steps may be performed in parallel.

In this example, initially, palette decoding unit 75 derives a quantization parameter (QP) for a palette-mode encoded block of video data (200). For example, palette decoding unit 75 may determine the QP using the following formula:

$$QP=(cIdx==0)?Qp'Y:((cIdx==1)?Qp'Cb:Qp'Cr)$$

In this example formula, cIdx represents a context index for the block of video data. The value of cIdx may be set based on whether the block is a luma block, a blue hue chrominance block, or a red hue chrominance block.

Palette decoding unit 75 may then determine a QP ratio value and a QP remainder value (202). For example, palette decoding unit 75 may determine the QP ratio (qPper) value and the QP remainder (qPrem) value according to the following formulas:

$$qPper=qP/6$$

$$qPrem=qP\%6$$

Palette decoding unit 75 may then derive a right shift parameter value (204). For example, palette decoding unit 75 may derive the right shift parameter (invQuantRightShift) value according to the following formula:

$$invQuantRightShift=6-qPper$$

Furthermore, palette decoding unit 75 may derive an offset parameter value (206). Palette decoding unit 75 may derive the offset parameter (addOffset) value according to the following formula:

$$addOffset=invQuantRightShift==0?0:1<<(invQuantRightShift-1)$$

Palette decoding unit 75 may then determine whether the right shift parameter value is less than or equal to zero (208). If not (i.e., if the right shift parameter value is greater than zero) ("NO" branch of 208), palette decoding unit 75 may calculate the de-quantized value for the escape pixel from a quantized value for the escape pixel using the right shift parameter value and the offset parameter value (210). For example, palette decoding unit 75 may calculate the de-quantized value (deQuantEspValue) according to the following formula:

$$deQuantEspValue=(EspValue*invQuantScale[qPrem]+addOffset)>>invQuantRightShift,$$

where EspValue represents the quantized value, and invQuantScale represents a lookup table, such as {40, 45, 51, 57, 64, 72}.

On the other hand, if the right shift parameter is less than or equal to zero ("YES" branch of 208), palette decoding unit 75 may calculate a left shift parameter value as being a positive value equal to the absolute value of the right shift parameter value (212). Palette decoding unit 75 may then calculate the de-quantized value from a quantized value using the left shift parameter value (214). For example, palette decoding unit 75 may calculate the de-quantized value (deQuantEspValue) according to the following formula:

deQuantEspValue=EspValue*invQuantScale[qPrem]
<<invQuantLeftShift

Palette decoding unit 75 may then round the de-quantized value (216). For example, palette decoding unit 75 may round the de-quantize value using the following example clipping operation:

deQuantEspValue=clip3(0,2$^{bitDepth}$−1,deQuantEspValue), where clip3 is a function as defined in ITU-T H.265. In particular, H.265 defines clip3(x, y, z) as follows:

$$clip3(x, y, z) = \begin{cases} x; z < x \\ y; z > y \\ z; \text{otherwise} \end{cases}$$

In other examples, other rounding operations may be used to ensure that the value of the de-quantized escape pixel is within a corresponding depth range.

In this manner, the method of FIG. 6 represents an example of a method including determining that a value for a right shift parameter for an escape-mode coded pixel of a palette-mode coded block of video data is less than zero, based on the original value for the right shift parameter being less than zero, setting a value for a left shift parameter to a positive value having an absolute value equal to an absolute value of the original value, and inverse quantizing the escape-mode coded pixel using the value of the left shift parameter.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

obtaining, by a video decoder, an escape-mode coded pixel of a palette-mode coded block of video data, the palette-mode coded block comprising palette index values mapping pixel values for the palette-mode coded block to respective entries of a color palette, the escape-mode coded pixel corresponding to a pixel value that is not in the color palette; and inverse quantizing, by the video decoder, the escape-mode coded pixel using a value of a left shift parameter, wherein inverse quantizing comprises calculating a value for the escape-mode coded pixel (deQuantEspValue) according to a formula comprising:

deQuantEspValue=EspValue*invQuantScale[qPrem]
<<invQuantLeftShift, wherein EspValue represents a coded quantized escape value coded for the escape-mode coded pixel, invQuantScale represents an array of inverse quantization scale values, qPrem represents a quantization parameter remainder value, invQuantLeftShift represents the value of the left shift parameter, and << represents the bitwise left shift operator.

2. The method of claim 1, further comprising determining the value for the left shift parameter based on a value of a quantization parameter (qP) for the block.

3. The method of claim 2, further comprising determining the value of qP based on a color component index (cIdx) of a color component including the escape-mode coded pixel.

4. The method of claim 2, wherein determining the value for the left shift parameter comprises:
    calculating a quantization ratio (qPper) according to the formula qPper=qP/6, wherein qP represents the value of the qP; and
    calculating the value for the left shift parameter using qPper.

5. The method of claim 1, wherein the array of inverse quantization scale values represented by invQuantScale comprises {40, 45, 51, 57, 64, 72}.

6. The method of claim 1, further comprising:
    decoding the color palette for the palette-mode coded block;
    decoding at least one of the pixel values of the block using the color palette; and
    reconstructing the block using the escape-mode coded pixel and the decoded at least one of the pixel values.

7. A device for decoding video data, the device comprising:
    a memory configured to store video data; and
    a video decoder configured to:
        obtain an escape-mode coded pixel of a palette-mode coded block of the video data, the palette-mode coded block comprising palette index values mapping pixel values for the palette-mode coded block to respective entries of a color palette, the escape-mode coded pixel corresponding to a pixel value that is not in the color palette; and
        inverse quantize the escape-mode coded pixel using the value of a left shift parameter, wherein to inverse quantize the escape-mode coded pixel, the video decoder is configured to calculate a value for the escape-mode coded pixel (deQuantEspValue) according to a formula comprising:

deQuantEspValue=EspValue*invQuantScale[qPrem]
    <<invQuantLeftShift, wherein EspValue represents a coded quantized escape value coded for the escape-mode coded pixel, invQuantScale represents an array of inverse quantization scale values, qPrem represents a quantization parameter remainder value, invQuantLeftShift represents the value of the left shift parameter, and << represents the bitwise left shift operator.

8. The device of claim 7, wherein the video decoder is further configured to determine the value for the left shift parameter based on a value of a quantization parameter (qP) for the block.

9. The device of claim 8, wherein the video decoder is further configured to determine the value of the qP based on a color component index (cIdx) of a color component including the escape-mode coded pixel.

10. The device of claim 8, wherein to determine the value for the left shift parameter, the video decoder is configured to:
    calculate a quantization ratio (qPper) according to the formula qPper=qP/6, wherein qP represents the value of the qP; and
    calculate the value for the left shift parameter using qPper.

11. The device of claim 7, wherein the array of inverse quantization scale values represented by invQuantScale comprises {40, 45, 51, 57, 64, 72}.

12. The device of claim 7, wherein the video decoder is further configured to:
    decode the palette for the palette-mode coded block;
    decode at least one of the pixel values of the block using the color palette; and
    reconstruct the block using the escape-mode coded pixel and the decoded at least one of the pixel values.

13. The device of claim 7, wherein the device comprises at least one of:
    an integrated circuit;
    a microprocessor; or
    a wireless communication device.

14. A device for decoding video data, the device comprising:
    means for obtaining an escape-mode coded pixel of a palette-mode coded block of video data, the palette-mode coded block comprising palette index values mapping pixel values for the palette-mode coded block to respective entries of a color palette, the escape-mode coded pixel corresponding to a pixel value that is not in the color palette; and
    means for inverse quantizing the escape-mode coded pixel using the value of the left shift parameter, wherein the means for inverse quantizing comprise means for calculating a value for the escape-mode coded pixel (deQuantEspValue) according to a formula comprising:

deQuantEspValue=EspValue*invQuantScale[qPrem]
    <<invQuantLeftShift, wherein EspValue represents a coded quantized escape value coded for the escape-mode coded pixel, invQuantScale represents an array of inverse quantization scale values, qPrem represents a quantization parameter remainder value, invQuantLeftShift represents the value of the left shift parameter, and << represents the bitwise left shift operator.

15. The device of claim 14, further comprising means for determining the value for the left shift parameter based on a value of a quantization parameter (qP) for the block.

16. The device of claim 15, further comprising means for determining the value of the qP based on a color component index (cIdx) of a color component including the escape-mode coded pixel.

17. The device of claim 15, wherein the means for determining the value for the left shift parameter comprises:
    means for calculating a quantization ratio (qPper) according to the formula qPper=qP/6, wherein qP represents the value of the qP; and
    means for calculating the value for the left shift parameter using qPper.

18. The device of claim 14, wherein the array of inverse quantization scale values represented by invQuantScale comprises {40, 45, 51, 57, 64, 72}.

19. The device of claim 14, further comprising:
    means for decoding the color palette for the palette-mode coded block;

means for decoding at least one of the pixel values of the block using the color palette; and means for reconstructing the block using the escape-mode coded pixel and the decoded at least one of the pixel values.

20. A non-transitory computer-readable storage medium having stored thereon instructions that, when executed, cause a processor of a device for decoding video data to:

obtain an escape-mode coded pixel of a palette-mode coded block of the video data, the palette-mode coded block comprising palette index values mapping pixel values for the palette-mode coded block to respective entries of a color palette, the escape-mode coded pixel corresponding to a pixel value that is not in the color palette; and inverse quantize the escape-mode coded pixel using the value of the left shift parameter wherein the instructions that cause the processor to inverse quantize comprise instructions that cause the processor to calculate a value for the escape-mode coded pixel (deQuantEspValue) according to a formula comprising:

deQuantEspValue=EspValue*invQuantScale[qPrem]<<invQuantLeftShift, wherein EspValue represents a coded quantized escape value coded for the escape-mode coded pixel, invQuantScale represents an array of inverse quantization scale values, qPrem represents a quantization parameter remainder value, invQuantLeftShift represents the value of the left shift parameter, and << represents the bitwise left shift operator.

21. The non-transitory computer-readable storage medium of claim 20, further comprising instructions that cause the processor to determine the value for the left shift parameter based on a value of a quantization parameter (qP) for the block.

22. The non-transitory computer-readable storage medium of claim 21, further comprising instructions that cause the processor to determine the value of the qP based on a color component index (cIdx) of a color component including the escape-mode coded pixel.

23. The non-transitory computer-readable storage medium of claim 21, wherein the instructions that cause the processor to determine the value for the left shift parameter comprise instructions that cause the processor to:

calculate a quantization ratio (qPper) according to the formula qPper=qP/6, wherein qP represents the value of the qP; and calculate the value for the left shift parameter using qPper.

24. The non-transitory computer-readable storage medium of claim 20, wherein the array of inverse quantization scale values represented by invQuantScale comprises {40, 45, 51, 57, 64, 72}.

25. The non-transitory computer-readable storage medium of claim 20, further comprising instructions that cause the processor to:

decode the color palette for the palette-mode coded block;

decode at least one of the pixel values of the block using the color palette; and reconstruct the block using the escape-mode coded pixel and the decoded at least one of the pixel values.

* * * * *